3,313,865
ALPHA-PINENE POLYMERIZATION
Fred Vohwinkel, Toledo, Ohio, assignor to Schenectady Chemicals, Inc., Schenectady, N.Y., a corporation of New York
No Drawing. Filed Dec. 10, 1964, Ser. No. 417,478
16 Claims. (Cl. 260—878)

This invention relates to the preparation of alpha pinene polymers.

At the present time it is conventional to make resins by polymerizing beta pinene alone or admixed with a small amount of alpha pinene using aluminum chloride or other metal halides. Such resins are characterized by a high softening point. Beta pinene is a relatively expensive material. It has also been proposed to polymerize the much cheaper alpha pinene. Unfortunately alpha pinene resins or copolymers in which alpha pinene predominates have softening points which are too low for commercial exploitation.

Accordingly it is an object of the invention to prepare alpha pinene resins having increased softening points.

Another object is to employ reduced amounts of aluminum bromide in preparing polymers from alpha pinene alone or admixed with minor amounts of beta pinene.

A further object is to prepare alpha pinene polymers in increased yields.

An additional object is to prepare an alpha pinene-polyethylene graft polymer.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the inventon will become apparent to those skilled in the art from this detailed description.

It has now been found that these objects can be attained by polymerizing alpha pinene containing up to 30 mol percent of beta pinene based on the total of alpha pinene and beta pinene in the presence of aluminum bromide as a catalyst, or by graft polymerizing alpha pinene to polyethylene with such a catalyst.

At room temperature high yields of high softening point resins are obtained by polymerizing alpha pinene with 5 mol percent of aluminum bromide based on the alpha pinene. Aluminum bromide, however, is a relatively expensive reagent. When attempts were made to reduce the aluminum bromide to 2.5 mol percent based on the alpha pinene there was a decrease in yield and only a soft resin was obtained, i.e. a resin having a softening point below 50° C. When aluminum chloride is employed as a catalyst for polymerizing alpha pinene there are obtained resins having a lower softening point than using the same mol percent of aluminum bromide. In addition the yields of resin are much lower.

It has now been found, however, that it is possible to form alpha pinene resins having a softening point of 50° C. or above in good yields using less than 5 mol percent of aluminum bromide based on the alpha pinene if there is also employed some aluminum chloride. Thus the aluminum bromide can be from 0.5 to 3 mol percent of the alpha pinene and the aluminum chloride can be from 2 to 10 mol percent of the alpha pinene. Preferably the $AlBr_3$ is at least 2 mol percent of the alpha pinene.

If a portion of the alpha pinene is replaced by beta pinene, e.g., 5, 10, 20 or 30 mol percent of the total of the two terpenes is beta pinene, then the amount of aluminum bromide required to give a resin having a softening point of 75° C. or above can be reduced to 1%.

When boron fluoride was employed in place of aluminum chloride in admixture with 2.5 mol percent of aluminum bromide based on the alpha pinene only soft resins were obtained.

The reaction is carried out at room temperature (20–25° C.) although heating, e.g. up to 60° C. can be employed or cooling, e.g. to 0° C. can be employed. For convenience the reaction is carried out in presence of an inert diluent, e.g. hydrocarbons such as benzene, toluene, xylene, naphtha or n-hexane.

Normally when using both aluminum chloride and aluminum bromide the pinene is pretreated with the aluminum chloride, e.g. for 30 minutes to 1 hour. The treatment with aluminum bromide is conveniently carried out for 24 hours although this can be varied, e.g. from 3 hours to 48 hours. The use of the shorter periods of time reduce the yield but are not otherwise objectionable.

The aluminum chloride reacts with impurities present in the alpha pinene and "cleans" the reaction mixture for the aluminum bromide which catalytic activity can thus be fully utilized.

The present invention also includes the grafting onto polyethylene of alpha pinene or a mixture of alpha pinene with up to 30 mol percent, e.g. 5, 10 or 20 mol percent, of beta pinene to produce a graft copolymer. The graft copolymer can be employed as a floor tile or in pressure sensitive tapes. The graft copolymer can contain 2 to 98% of the terpene polymer and 98 to 2% of polyethylene.

Unless otherwise indicated all parts and percentages are by weight.

EXAMPLE 1

There was provided a 4-neck flask equipped with stirrer, thermometer, separatory funnel and condenser. Then it was evacuated and purged with nitrogen. This was repeated twice. 26.7 grams (0.1 mol) of aluminum bromide in 136 grams of xylene was charged under a nitrogen blanket into the flask. Next 272 grams (2 moles) of alpha pinene was added to the flask with nitrogen purging. The ensuing exothermic reaction was kept under control at 20–25° C. by a cold water bath. The addition time was 30–40 minutes. After all the monomer was added the reaction was continued for 24 hours at room temperature. The reaction was stopped by quenching with cold water. The water was decanted off and the resin washed with water to remove the catalyst. The solution containing the polymer was transferred to a distillation flask and heated to remove the solvent. The resulting polymer was hardened at 250° C. at atmospheric pressure, for 60 minutes and discharged. There were obtained 218 grams of hard resin, softening point 124.5° C.

In all of the examples the softening point was measured by the Ball and Ring method.

EXAMPLE 2

The same procedure as that employed in Example 1 was employed but there were used 272 grams (2 moles) of alpha pinene, 136 grams of xylene and 13.35 grams (0.1 mole) of aluminum chloride. There was obtained as the product 61.6 grams of resin having a softening point of 94.7° C.

EXAMPLE 3

The procedure of Example 1 was employed but there was used as a catalyst a mixture of aluminum chloride and aluminum bromide. Thus there was charged to the flask 272 grams (2 moles) of alpha pinene, 136 grams of xylene, 13.35 grams (0.05 mole) of aluminum bromide and 6.67 grams (0.05 mole) of aluminum chloride. The resulting resinous polymer had a softening point of 78° C. and was recovered in a yield of 236.9 grams.

EXAMPLE 4

The procedure employed in Example 1 was modified in the following manner. A mixture of 16.7 grams (0.125 mole) of aluminum chloride and 136 grams of xylene were charged into the flask. Then there was added 272 grams (2 moles) of alpha pinene and this mixture was allowed to react at room temperature for 1 hour. Then there was added 6.67 grams (0.025 mole) of aluminum bromide and the reaction was continued for an additional 23 hours at room temperature. The resinous polymer obtained had a softening point of 50° C. and was recovered in a yield of 236.2 grams.

EXAMPLE 5

The procedure of Example 4 was repeated using the following proportions of materials:

| | Grams |
|---|---|
| Alpha pinene (2 moles) | 272 |
| Xylene | 136 |
| AlCl$_3$ (0.1375 mole) | 18.35 |
| AlBr$_3$ (0.0125 mole) | 3.35 |

The resinous polymer obtained had a softening point of 50° C. and the yield was 231.2 grams.

EXAMPLE 6

The procedure of Example 4 was repeated using the following materials:

| | Grams |
|---|---|
| Alpha pinene (2 moles) | 272 |
| Xylene | 136 |
| Aluminum chloride (0.1 mole) | 13.35 |
| Aluminum bromide (0.05 mole) | 13.35 |

The resin obtained had a softening point of 65.3° C. and the yield was 236.9 grams.

EXAMPLE 7

The procedure of Example 5 was repeated but the reaction was carried out at 0–5° C. There was obtained the resinous product in a yield of 205.6 grams. In addition there were obtained 46.8 grams of a heavy oil in contrast to only 26.0 grams of heavy oil in Example 5.

EXAMPLE 8

The procedure of Example 1 was repeated but the terpene used was a mixture of alpha pinene and beta-pinene. The materials employed were as follows:

| | Grams |
|---|---|
| Alpha-pinene (1.8 moles) | 245 |
| Beta-pinene (0.2 mole) | 27 |
| Xylene | 136 |
| Aluminum chloride (0.05 mole) | 6.67 |
| Aluminum bromide (0.05 mole) | 13.35 |

The resin obtained had a softening point of 91.5° C. and the yield was 240.1 grams.

EXAMPLE 9

The procedure of Example 4 was repeated using a mixture of terpenes. The materials employed were:

| | Grams |
|---|---|
| Alpha-pinene (1.8 moles) | 245 |
| Beta-pinene (0.2 mole) | 27 |
| Xylene | 136 |
| Aluminum chloride (0.125 mole) | 16.70 |
| Aluminum bromide (0.02 mole) | 6.67 |

The resin obtained had a softening point of 82.5° C. and the yield was 222.8 grams.

EXAMPLE 10

The procedure of Example 9 was repeated using the following materials:

| | Grams |
|---|---|
| Alpha-pinene (1.6 moles) | 218 |
| Beta-pinene (0.4 mole) | 54 |
| Xylene | 136 |
| Aluminum chloride (0.1375 mole) | 18.35 |
| Aluminum bromide (0.0125 mole) | 3.35 |

The resin obtained had a softening point of 83.0° C. and the yield was 229.8 grams.

EXAMPLE 11

The procedure of Example 1 was repeated using the following materials:

| | Grams |
|---|---|
| Alpha-pinene (1.6 moles) | 218 |
| Beta-pinene (0.4 mole) | 54 |
| Xylene | 136 |
| Aluminum chloride (0.05 mole) | 6.67 |
| Aluminum bromide (0.05 mole) | 13.35 |

The resin obtained had a softening point of 102° C. and the yield was 234.6 grams.

EXAMPLE 12

27.2 grams of commercial polyethylene (high pressure, low density) was dissolved in 544 grams of xylene. Then there were added 6.67 grams (0.05 mole) of aluminum chloride and 13.35 grams (0.05 mole) of aluminum bromide followed by 272 grams (2 moles) of alpha-pinene. The reaction was then continued for 24 hours according to the procedure of Example 1 including the subsequent steps of washing and distillation. The resulting graft copolymer obtained had a sofetning point of 92° C. and the yield was 256.2 grams.

What is claimed is:

1. A process of preparing a resin from alpha-pinene containing up to 30% of beta-pinene comprising carrying out the reaction in the presence of a mixture of 0.5 to 3 mol percent of aluminum bromide and 2 to 10 mol percent of aluminum chloride based on the total terpenes present.

2. A process according to claim 1 carried out at room temperature.

3. A process of preparing a resinous homopolymer from alpha-pinene comprising carrying out the reaction in the presence of a mixture of 1 to 3 mol percent of aluminum bromide and 2 to 10 mol percent of aluminum chloride based on the alpha-pinene.

4. A process according to claim 3 wherein the aluminum bromide is 2 to 3 mol percent based on the alpha-pinene.

5. A process according to claim 3 wherein there is used 2.5 mol percent of aluminum bromide and 2.5 to 5 mol percent of aluminum chloride.

6. A process of preparing a resinous copolymer of alpha-pinene and beta-pinene comprising reacting a mixture of 70 to 95% of alpha-pinene and 5 to 30% of beta-pinene in the presence of 0.5 to 3 mol percent of aluminum bromide and 2 to 10 mol percent of aluminum chloride based on the total terpenes present.

7. A process according to claim 6 wherein the aluminum bromide is 1.25 to 2.5 mol percent and the aluminum chloride is 2.5 to 7% based on the total terpenes present.

8. A process according to claim 6 wherein there is used 1.25 mol percent of aluminum bromide and 6.87% aluminum chloride.

9. A process according to claim 6 wherein there is used 2.5 mol percent of aluminum bromide and 2.5 mol percent of aluminum chloride.

10. A process according to claim 7 carried out at room temperature.

11. A process comprising homopolymerizing alpha-pinene in the presence of 2.5 to 10 mol percent of aluminum bromide based on the alpha-pinene.

12. A process according to claim 11 wherein the catalyst consists of 5 mol percent of aluminum bromide based on the alpha-pinene.

13. A graft copolymer of alpha-pinene monomer polymerized onto a polyethylene backbone.

14. A graft copolymer according to claim 13 wherein the copolymer is made from 1 part by weight polyethylene and 10 parts by weight alpha-pinene.

15. A process of preparing a graft copolymer of polyethylene and alpha-pinene comprising reacting polyethylene in solution in an inert solvent with alpha-pinene in the presence of aluminum bromide as a catalyst.

16. A process according to claim 15 wherein the catalyst is a mixture of aluminum bromide and aluminum chloride.

References Cited by the Applicant
UNITED STATES PATENTS

| | | |
|---|---|---|
| 2,373,419 | 4/1945 | Rummelsburg. |
| 2,483,124 | 9/1949 | Corkery. |
| 2,567,916 | 9/1951 | Burroughs. |
| 2,567,918 | 9/1951 | Burroughs. |
| 2,567,919 | 9/1951 | Burroughs. |
| 2,568,216 | 9/1951 | Burroughs. |
| 2,568,217 | 9/1951 | Burroughs. |
| 2,814,610 | 11/1957 | Braidwood. |

MURRAY TILLMAN, *Primary Examiner.*

D. J. BREZNER, *Assistant Examiner.*